(12) United States Patent
Zeck et al.

(10) Patent No.: US 6,723,375 B2
(45) Date of Patent: Apr. 20, 2004

(54) PORTABLE LOCATOR INCLUDING A GROUND MARKING ARRANGEMENT

(75) Inventors: Joseph Zeck, Issaquah, WA (US); Stuart G. Emigh, Des Moines, WA (US)

(73) Assignee: Merlin Technology, Inc., Renton, WA (US)

( * ) Notice: Subject to any disclaimer, the term of this patent is extended or adjusted under 35 U.S.C. 154(b) by 0 days.

(21) Appl. No.: 10/040,728

(22) Filed: Dec. 29, 2001

(65) Prior Publication Data

US 2002/0053608 A1 May 9, 2002

Related U.S. Application Data

(63) Continuation of application No. 09/539,899, filed on Mar. 30, 2000.

(51) Int. Cl.[7] .............................. E01C 5/00; B05D 1/02; G01V 3/10
(52) U.S. Cl. ...................... 427/136; 427/421; 324/326
(58) Field of Search .......................... 118/300; 324/326; 427/421, 136, 137

(56) References Cited

U.S. PATENT DOCUMENTS

| | | | |
|---|---|---|---|
| 4,387,340 A | * | 6/1983 | Peterman .................... 324/326 |
| 4,624,602 A | | 11/1986 | Kieffer et al. |
| 4,738,060 A | * | 4/1988 | Marthaler et al. ............. 52/103 |
| 5,318,208 A | | 6/1994 | Van der Wal |
| 5,368,202 A | * | 11/1994 | Smrt ........................... 222/174 |
| 5,633,589 A | | 5/1997 | Mercer |
| 5,918,565 A | | 7/1999 | Casas |
| 6,053,260 A | | 4/2000 | Boon et al. |
| 6,062,443 A | * | 5/2000 | Smrt ........................... 222/608 |
| 6,064,940 A | * | 5/2000 | Rodgers et al. ............. 701/207 |
| 6,074,693 A | | 6/2000 | Manning |
| 6,294,022 B1 | * | 9/2001 | Eslambolchi et al. ........ 118/315 |

* cited by examiner

Primary Examiner—Shrive P. Beck
Assistant Examiner—Eric B. Fuller
(74) Attorney, Agent, or Firm—Michael Pritzkau

(57) ABSTRACT

An improved portable locator is described which is configured for locating relative to a position beneath the surface of the ground. The improvement includes a marking arrangement for marking the surface of the ground. In one aspect, the portable locator is configured having a marking arrangement which utilizes a replaceable aerosol paint canister. Spray of paint from the canister may be initiated, for example, electrically or using a suitable mechanical actuation linkage. In another aspect, an operator of the portable locator is able to mark the surface of the ground using the portable locator and while holding the portable locator in generally the same position and/or stance as the locator is used for locating purposes.

32 Claims, 4 Drawing Sheets

PORTABLE LOCATOR INCLUDING A GROUND MARKING ARRANGEMENT

This is a continuation application of copending prior Application No. 09/539,899, filed on Mar. 30, 2000, the disclosure of which are incorporated herein by reference.

The present invention relates generally to in-ground locating using a portable locator and, more particularly, to a able locator including an integral ground marking arrangement.

Portable locators have become popular, for example, as part of locating arrangements used with underground horizontal boring equipment. In particular, hand held portable locators enable tracking of a boring tool which is configured for emitting a locating field from the position of the boring tool beneath the surface of the ground. As examples of state of the art locating systems which incorporate portable walk over locators see U.S. Patent No. 4,387,380 entitled APPARATUS FOR DETERMINING THE DISTANCE TO A CONCEALED OBJECT WHICH IS RADIATING AN ALTERNATING CURRENT SIGNAL (hereinafter the '380 patent) and U.S. Patent No. 5,633,589 entitled DEVICE AND METHOD FOR LOCATING AN INGROUND OBJECT AND A HOUSING FORMING PART OF SAID DEVICE (hereinafter the '589 patent). It is noted that the latter patent is commonly assigned with the present application.

The '589 patent utilizes a hand held portable locator which can be held at a user determined height above the surface of the ground. Because the height of the locator above the surface of the ground has a critical effect on locating measurements, an ultrasonic detecting arrangement within the locator senses the distance between the surface and the portable locator during measurements of the locating field.

The portable locator of the '340 patent, in contrast, utilizes a stand-off leg for establishing locator height. When locating field measurements are taken, the lower end of the stand-off leg is positioned on the surface of the ground so as to fix the height of the measurement point within the locator at a predetermined distance above the surface of the ground.

In the normal course of a horizontal drilling operation, using either of the aforedescribed portable locator styles, it is often desired to mark the surface of the ground directly above the underground path of the boring tool or to make other reference marks. To that end, the operator of the portable locator will often carry some sort of marking device such as a canister of aerosol paint. Aerosol paint canisters are readily available in various configurations for marking the surface of the ground. Moreover, extension handles are also available and are popular for holding one of these aerosol canisters, the combination of which may be referred to hereinafter as a marking wand. Using a marking wand, the operator can mark the surface of the ground from a substantially upright position. An operator can determine a location on the surface of the ground using the locator in one hand and then swing the portable locator out of the way to mark the surface of the ground with paint by having the marking wand in the other hand. While this arrangement seems generally convenient, it is unfortunate that still further tasks are normally required of the locator operator, as will be described immediately hereinafter.

In addition to operating the portable locator while marking the surface of the ground, the locator operator is normally required to communicate guidance commands to another operator stationed at a drill rig powering the underground boring tool. This communication, in most instances, is performed using walkie-talkies. With the portable locator in one hand and the marking wand in the other, the portable locator operator must typically place either the marking wand or the locator on the ground in order to free one hand for operating the walkie-talkie. In this regard, it should be appreciated that the aerosol marking wand and portable locator are each somewhat bulky and inconvenient to repeatedly place on the ground and pick up. Moreover, there may be situations in which the portable locator itself requires two hands to operate or the operator requires a free hand for additional tasks such as, for example, recording log entries or using a walkie-talkie to issue drilling commands. For these and other reasons, portable locator operators are seen to encounter problems in having an insufficient number of hands to operate three or more separate devices, all of which are important to the drilling operation.

The present invention provides a portable locator having an integral ground marking arrangement which serves to reduce or eliminate the foregoing problems in a highly advantageous and heretofore unseen way.

SUMMARY OF THE INVENTION

As will be described in more detail hereinafter, there is disclosed herein an improvement in a portable locator configured for locating relative to a position beneath the surface of the ground. The improvement being a marking arrangement for marking the surface of the ground.

In one aspect of the invention the portable locator is configured having a marking arrangement which utilizes a replaceable aerosol paint canister. Spray of paint from the canister may be initiated, for example, electrically or using a suitable mechanical actuation linkage.

In another aspect of the invention, an operator of the portable locator of the present invention is able to mark the surface of the ground using the portable locator and while holding the portable locator in generally the same position and/or stance as the locator is used for locating purposes.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
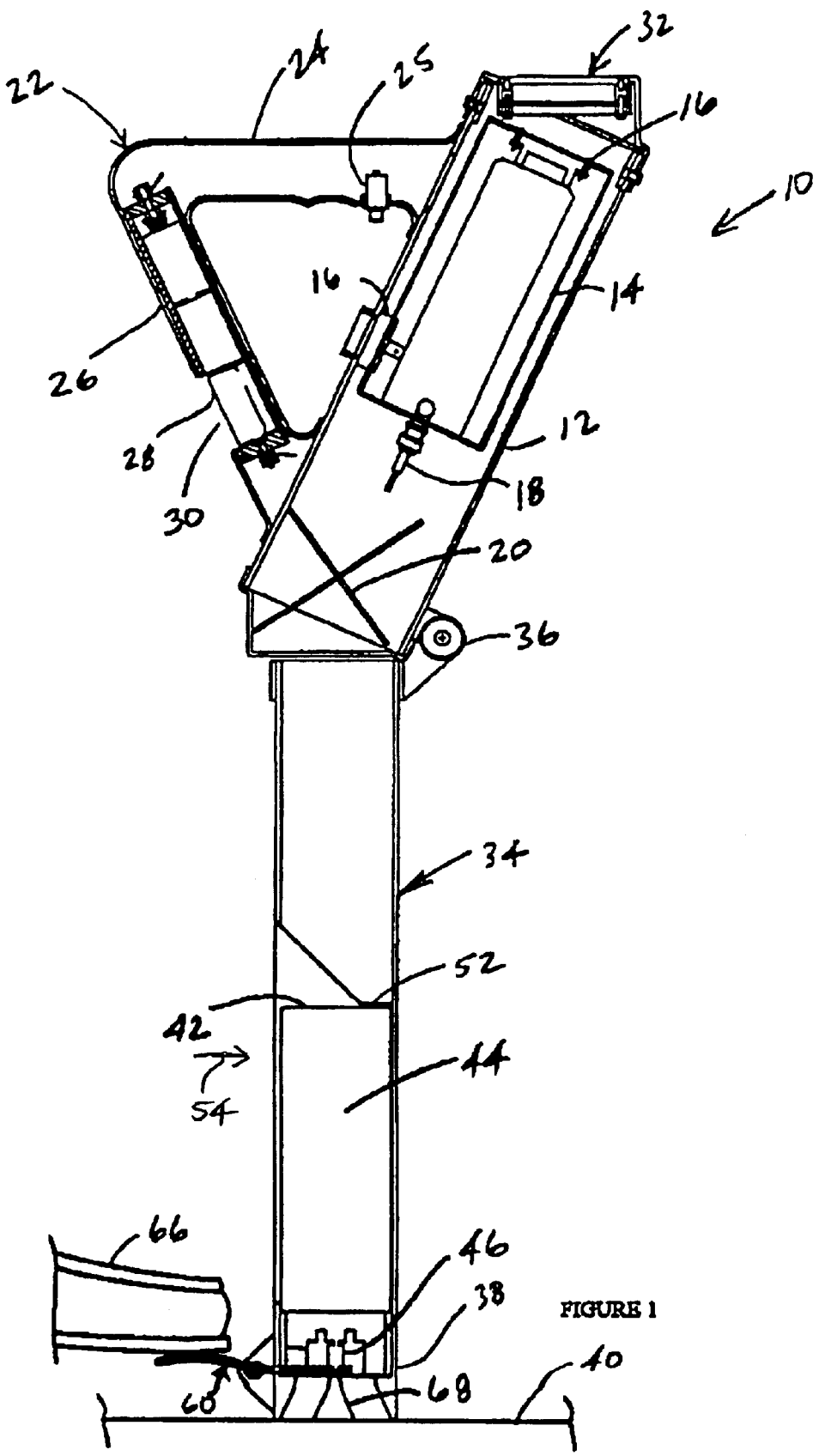
FIG. 1 is a diagrammatic cross-sectional view, in elevation of a first embodiment of a portable locator configured for inground locating shown here to illustrate a marking arrangement which forms part of the portable locator in accordance with the present invention.

Turning to the drawings, wherein like components are designated by like reference numerals throughout the various figures, attention is initially directed to FIG. 1. This figure illustrates a first embodiment of a portable hand held locator manufactured in accordance with the present invention and generally indicated by reference numeral 10. It should be appreciated that portable locator 10 is suitable for use as part of virtually any underground locating system in which a portable locator is useful. Therefore, the described configuration may be modified in any manner that is suited to a particular application. In the illustrated configuration, portable locator 10 includes a housing 12 which encloses an electronics package 14 supported by a plurality of mounts 16. A cabling assembly 18, which is only partially shown for purposes of clarity, is used to interconnect the electronics package with other portions of the locator. An "X" configured antenna assembly 20 is located in housing 12 below electronics package 14.

Still referring to FIG. 1, a handle assembly 22 includes a hand grip portion 24 by which an operator (not shown) normally carries the locator during use. A push button switch 25 is mounted in the hand grip for ease of actuation by the operator and is electrically connected (not shown) to electronics package 14. The push button switch may be actuated, for example, when a locating measurement is taken or in performing other tasks, as will be described. A battery compartment portion 26 of the handle assembly, in this instance, is configured to hold three standard C cell batteries 28 for powering the overall unit. The housing is cut away to provide a battery access opening 30. A display assembly 32 is provided for conveying information relating to the locating operation in any suitable display format. A stand-off leg 34 is attached to housing 12 using a hinge 36. During operation, the locator is configured as illustrated with stand-off leg 34 extending downwardly. During storage or transport of locator 10, stand-off leg may be folded (not shown) against housing 14 using hinge 36 so as to result in a more compact configuration. As described above, stand-off leg 34 includes a predetermined length which establishes the distance of antenna assembly 20 above the surface of the ground when a lowermost end 38 of the stand-off leg is placed into contact with a surface 40 of the ground during locating measurements.

Figure 2:
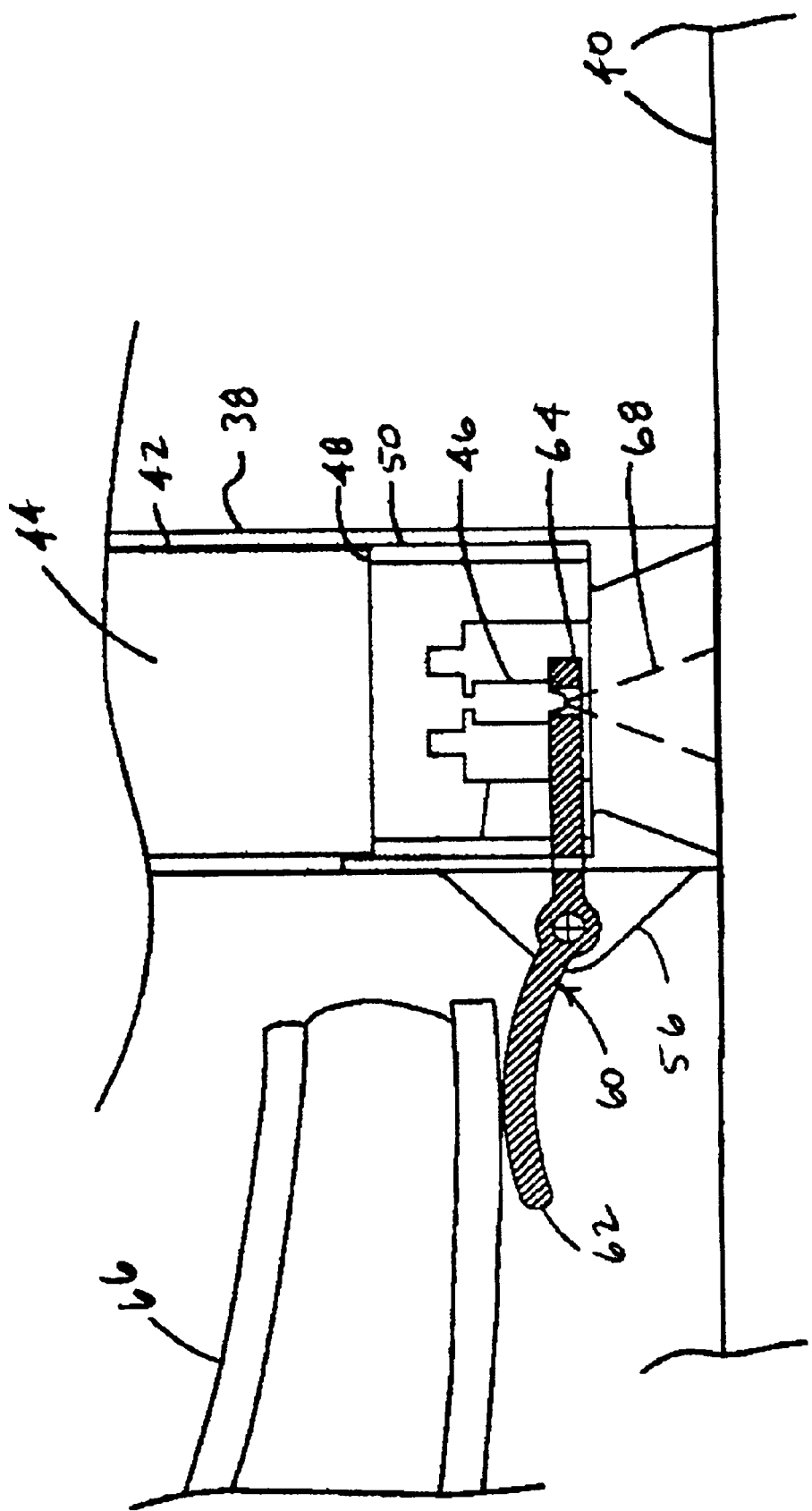
FIG. 2 is a partial, enlarged cross-sectional diagrammatic view of the first embodiment of the portable locator of FIG. 1, shown here to illustrate details of the ground marking arrangement of the present invention which forms a portion of a stand-off leg.

Referring to FIG. 2 in conjunction with FIG. 1, in accordance with the present invention, the lower end of stand-off leg 34 is configured for receiving an aerosol paint canister 42 within a paint chamber 44 defined by the stand-off such that a spray nozzle 46 of the canister is directed downwardly and supported at a suitable, predetermined distance above the surface of the ground when the lowermost end contacts the surface of the ground. When canister 42 is fully received in the paint chamber, FIG. 2 best illustrates an upper edge 48 of a support ring 50 contacting a peripheral edge in the outline of the aerosol canister. Paint chamber 44 may be sized such that the nozzle end of aerosol canister 42 is first positioned in the paint chamber at least partially seated against upper edge 48 of the support ring. Thereafter, the upper end of the canister, as illustrated in FIG. 1, may be "snapped" into position against a holding face 52 by moving the upper end of the canister in a direction indicated by an arrow 54 such that the aerosol canister is captured between support ring 50 and holding face 52. While the illustrated arrangement is well suited for supporting the aerosol canister, it is to be understood that the present invention contemplates the use of any arrangement which removably supports canister 42 at the desired position within the stand-off leg. Moreover, aerosol canisters are available in many configurations and appropriate modifications or adapter fittings may be provided to accommodate these various configurations either existing or to be developed.

Referring to FIG. 2, a gusset 56 pivotally supports a spray lever 60 having an pedal end 62 and a nozzle actuation end 64. In order to mark the surface of the ground, the operator first places lowermost end 38 onto the surface, as shown. Spray lever 60 is configured such that downward force applied to pedal end 62 by the foot 66 (only partially shown) of the operator causes nozzle actuation end 64 of the spray lever to move upwardly, thereby engaging nozzle 46 and causing a spray 68 of paint to be emitted downwardly onto the surface of the ground. It should be appreciated that spray lever 60 may be configured in any appropriate manner, for example, based on the specific design of nozzle 46.

Figure 3:
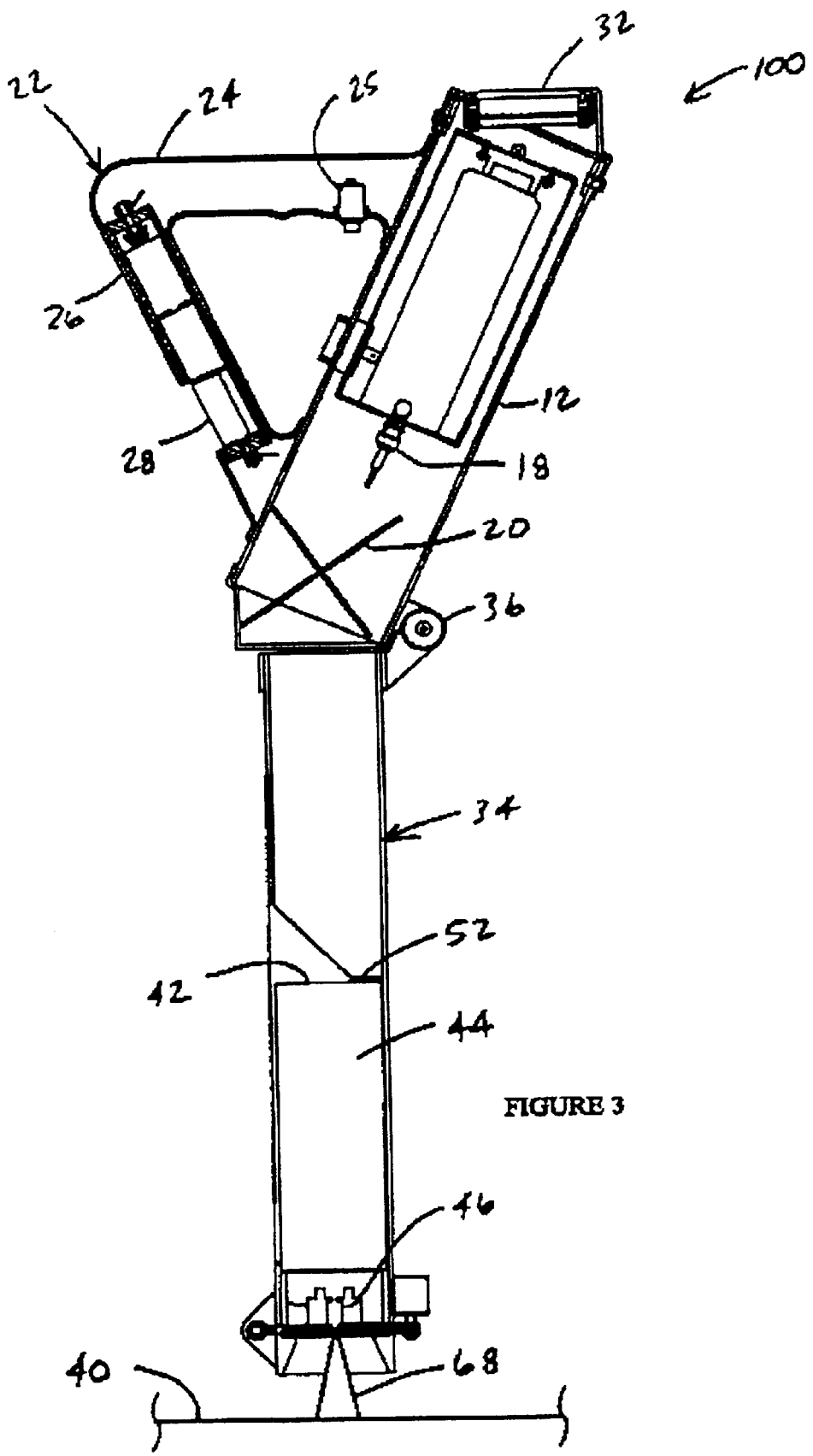
FIG. 3 is diagrammatic cross-sectional view, in elevation of a second embodiment of a portable locator configured for inground locating shown here to illustrate an alternative ground marking arrangement which forms part of the portable locator in accordance with the present invention.

Referring now to FIG. 3 and having described a first embodiment of the locator of the present invention, it should be appreciated that a wide range of other embodiments is also possible. For example, FIG. 3 illustrates a second embodiment of the portable locator of the present invention generally indicated by the reference number 100. It should be appreciated that a majority of the components shown in FIG. 3 have been described previously, therefore descriptions of these components will not be repeated for purposes of brevity.

Figure 4:
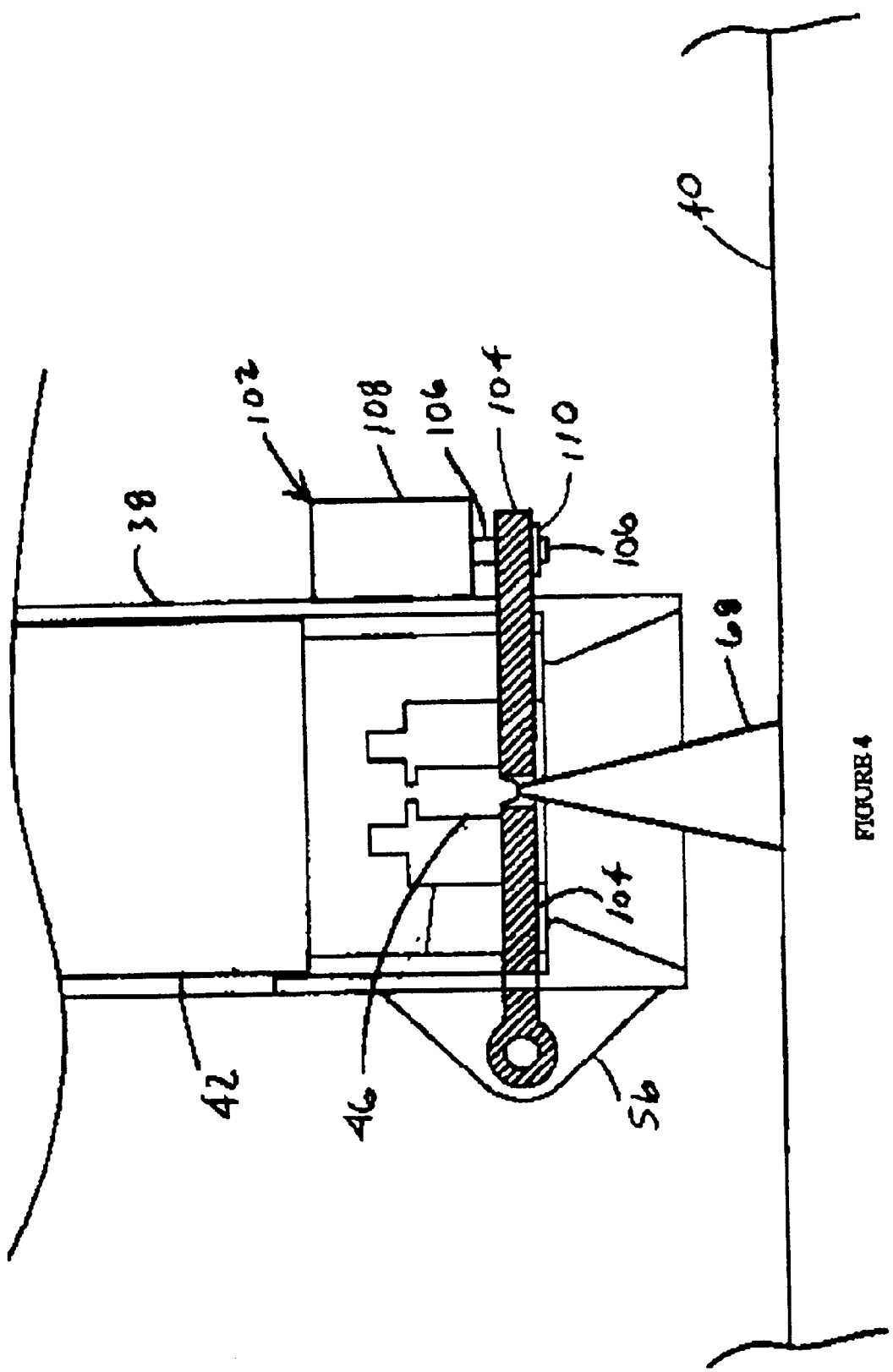
FIG. 4 is a partial, enlarged cross-sectional diagrammatic view of second embodiment of the portable locator of FIG. 3, shown here to illustrate details of the alternative ground marking arrangement of the present invention which forms a portion of the stand-off leg of the portable locator.

Referring to FIGS. 3 and 4, in accordance with the present invention, locator 100 includes an electrical actuation arrangement indicated by the reference number 102 for initiating marking of surface 40 of the ground. As best seen in FIG. 4, electrical actuation arrangement 102 includes an extended lever 104 pivotally attached at one end to gusset 56 and attached at an opposing end to a plunger 106 of a solenoid 108. The extended lever may be slidably secured onto plunger 106, for example, by a one-way lock washer 110. Solenoid 108 is connected to electronics package 14 in a suitable manner which is not shown since such it is considered that such interconnections may readily be provided by one having ordinary skill in the art. Electrical power may be routed between housing 12 and stand-off leg 34, for example, using a slip ring arrangement in hinge 36.

Still referring to FIGS. 3 and 4, electronics package 14 may be configured to respond to a predetermined actuation of switch 25 to initiate the marking process. For example, if switch 25 is depressed twice in rapid succession and held closed the electronics package may respond by actuating solenoid 108. In this regard, the electronics package includes a driver circuit which, in one implementation, serves to form a series connection of batteries 28 and solenoid 108 in response to the predetermined actuation of switch 25. Thereafter, when electrical current flows through solenoid 108 plunger 106 moves upward to move the free end of extended lever 104 upward so as to apply force to spray nozzle 46 causing paint 68 to spray onto surface 40 of the ground. It is noted that the depicted arrangement can be used to mark the surface of the ground irrespective of whether the lowermost end of stand-off leg 34 is in contact with the surface of the ground. It is to be understood that alternative electrical actuation arrangements (not shown) may be configured in many other ways with respect to either mechanical or electrical aspects within the scope of the present invention. For example, a solenoid may apply a lateral force to spray nozzle 46. Of course, electrical actuation arrangements may be configured to suit particular configurations of aerosol paint canisters. As another example, a switch (not shown) separate from switch 25 may be provided in a position on the locator convenient to the operator to initiate marking of the surface of the ground.

Referring to FIG. 1, the present invention also contemplates a completely mechanical actuation arrangement (not shown) incorporating a trigger in handle assembly 22 for causing paint to spray from canister 42. The provision of such a mechanical linkage is considered to be within the ability of one having ordinary skill in the art in view of this overall disclosure.

Referring to FIGS. 1–4, having described several implementations of the ground marking locator arrangement of the present invention, it is now appropriate to discuss its advantages. It should first be appreciated that an operator of the locator of the present invention is able to mark the ground without the need to carry a separate marking device. In the instance of locator 10, the operator simply depresses pedal end 62 of spray lever 60 while, in the instance of locator 100, the operator simply actuates switch 25 in a predetermined way. In either case, a mark is formed on the ground while the operator's other hand remains free to perform other tasks such as, for example, operating a walkie-talkie. At the same time, it should be appreciated that, when using either implementation, the operator may remain standing in a substantially upright position without the need to repeatedly bend over in order to mark the ground. In other words, the operator is able to mark the ground while holding the locator in substantially the same manner as the locator is held for locating purposes. For these reasons alone, the present invention is submitted to be highly advantageous. The ground marking portable locator of the present invention has not been seen heretofore by Applicants and is thought to be a significant enhancement in the field. As one example, in systems using a portable locator for tracking the underground progress of a boring tool, an operator may efficiently mark the path of the boring tool on the ground surface without the need frequently change body positions and while one hand remains free to attend to other tasks.

It should be appreciated that the present invention contemplates marking the surface of the ground using materials other than aerosol paint which have not been shown for purposes of brevity. For example, chalk may be used which is dropped onto the ground surface. As another example using chalk, a chalk stick may be removably mounted at the lowermost end of stand-off leg 34. As still another example, a pin which support a marking flag or tuft may be pressed or injected into the ground.

It should be noted that the present invention is not limited to the embodiments and methods described herein. For instance, the marking arrangement of the present invention may be used to identify the underground location of a utility. Such underground utilities may be located using a signal induced thereon or in some other suitable manner. Any arrangement or method useful in a portable locator for marking the surface of the ground is considered to be within the scope of the present invention. Therefore, the present examples are to be considered as illustrative and not restrictive, and the invention is not to be limited to the details given herein, but may be modified within the scope of the appended claims.

What is claimed is:

1. A method comprising the steps of:

configuring a portable locator that is used for locating at least one of a buried line and a boring tool to integrally support a marking arrangement for marking the surface of the ground, said locating arrangement being supported in one operating position, as part of the portable locator, in relation to said marking arrangement in another operating position, as another part of the portable locator; and interfacing a single operator actuation mechanism with a single electronics package in the portable locator for monitoring different predetermined operator actuations such that the single electronics package monitors all the different predetermined operator actuations of the single operator actuation mechanism (i) to detect a first predetermined operator actuation for use in controlling the ground marking arrangement, (ii) to detect other predetermined operator actuations for use in controlling the locating arrangement and (iii) to, upon detecting the first predetermined operator actuation, initiate marking by the ground marking arrangement.

2. The method of claim 1 including configuring the marking arrangement to mark the surface of the ground using aerosol paint responsive to said electronics package.

3. The method of claim 2 including the step of configuring said marking arrangement to accept a replaceable canister of aerosol paint.

4. The method of claim 1 including the step of configuring the marking arrangement such that an operator of the portable locator, in a generally upright position, locates using said locating arrangement and marks the surface of the ground using the marking arrangement.

5. The method of claim 4 wherein the marking arrangement is configured for finger actuation by said operator.

6. The method of claim 5 wherein the surface of the ground is marked using aerosol paint.

7. The method of claim 1 including the steps of configuring said marking arrangement for marking the surface of the ground using aerosol paint contained in a replaceable canister and providing an electrical actuation arrangement, responsive to said electronics package, for causing emission of the aerosol paint from the canister in response to a finger actuation by an operator.

8. The method of claim 7 wherein said step of providing the electrical actuation arrangement includes the step of using a solenoid to cause emission of the aerosol paint.

9. The method of claim 8 including the steps of interfacing the solenoid with the electronics package, as part of the electrical actuation arrangement, and interfacing the electronics package with a push button switch such that the electronics package electrically actuates the solenoid responsive to the operator engaging the push button switch.

10. The method of claim 8 wherein the solenoid includes a plunger and wherein the step of using the solenoid causes movement of the plunger which movement produces emission of the paint from the canister.

11. The method of claim 10 including the step of connecting the plunger of the solenoid with a lever and arranging the lever proximate to the canister so that movement of the plunger causes the lever to engage the canister to emit the aerosol paint.

12. The method of claim 11 further comprising the steps of housing a battery pack in the portable locator and powering the solenoid and the electronics package from the battery pack.

13. A method for using a portable locator which is configured for locating relative to a position beneath the surface of the ground, said method comprising the steps of:

configuring the portable locator to include a marking arrangement including a canister for emitting an aerosol paint to mark the surface of the ground;

interfacing a single electronics package that is configured for performing an inground locating function within the portable locator to (i) a single push button switch located for finger actuation by an operator in a first of a number of predetermined kinds of actuations with the operator standing in an upright position holding the portable locator and to (ii) a solenoid having a plunger, others of said predetermined kinds of actuations being provided for operating the locator such that the single electronics package monitors all the different predetermined kinds of actuations of the single push button switch;

housing a battery back in the portable locator for providing power to the electronics package and the solenoid such that the first predetermined actuation of the push button switch causes the electronics package to electrically drive the solenoid thereby moving the plunger of the solenoid; and connecting the plunger of said solenoid with a lever arranged proximate to the canister such that movement of the plunger, as a result of the electronics package driving the solenoid, engages the lever with the canister resulting in emission of the aerosol paint.

14. The method of claim 13 further comprising the steps of:

with the portable locator, establishing a location on the surface of the ground relative to said position; and marking the location on the surface of the ground using said marking arrangement.

15. The method of claim 13 including the step of electronically monitoring operator actuations of the push button switch to detect the first predetermined operator actuation for use in controlling the marking arrangement, to detect the other predetermined operator actuations for use in controlling the locating arrangement, and to, upon detecting the first predetermined operator actuation, initiate marking by the marking arrangement.

16. The method of claim 15 wherein said electronic monitoring step includes the step of monitoring the switch for said first predetermined operator actuation as a sequence of closing the push button switch twice in timed succession and then holding the push button switch closed.

17. A method for fabricating a portable device, said method comprising the steps of:

configuring a housing arrangement to define a first operating position and to define a second operating position;

supporting a locating arrangement at the first operating position and supporting a ground marking arrangement at the second operating position such that the locating arrangement and the ground marking arrangement in the first and second operating positions, respectively, cooperate for use by an operator in identifying a location on the surface of the ground relative to at least one of a buried line and a boring tool with said locating arrangement and for said operator to mark the location using said ground marking arrangement; and interfacing a single operator actuation mechanism with a single electronics package in the portable locator for monitoring different predetermined operator actuations of the portable locator such that the single electronics package monitors all the different predetermined operator actuations of the single operator actuation mechanism (i) to detect a first predetermined operator actuation for use in controlling the ground marking arrangement, (ii) to detect other predetermined operator actuations for use in controlling the locating arrangement and (iii) to, upon detecting the first predetermined operator actuation, initiate marking by the ground marking arrangement.

18. The method of claim 17 wherein the step of configuring said housing arrangement includes the steps of forming a first housing portion and a second housing portion, positioning said locating arrangement within said first housing portion, and positioning said ground marking arrangement within said second housing portion.

19. The method of claim 18 further including the step of hinging the first housing portion to the second housing portion for movement of the first and second housing portions between an operational configuration for use by said operator and a compact configuration for at least one of transport and storage.

20. The method of claim 17 wherein the electronics package is to monitor a switch for said first predetermined operator actuation and said other predetermined operator actuations.

21. The method of claim 20 wherein said step of arranging the electronics package uses the electronics package to monitor the switch for said first predetermined operator actuation as a sequence of closing the switch twice in timed succession and then holding the switch closed.

22. The method of claim 17 including the step of configuring said ground marking arrangement for marking the location on the surface of the ground using aerosol paint contained in a replaceable canister.

23. The method of claim 22 wherein said step of arranging the electronics package includes the step of using a solenoid to cause emission of the aerosol paint from the replaceable canister.

24. The method of claim 23 wherein said solenoid includes a plunger and wherein said step of using the solenoid includes the step of causing movement of the plunger, which movement produces emission of the aerosol paint from the replaceable canister.

25. The method of claim 23 wherein said step of using the solenoid includes the steps of:

interfacing the solenoid with said electronics package; and configuring the electronics package such that the electronics package electrically drives the solenoid responsive to detection of said predetermined operator actuation.

26. The method of claim 25 wherein said step of using the solenoid further includes the steps of:

housing a battery pack in the portable device; and powering the solenoid and the electronics package from the battery pack.

27. A method for fabricating a portable device, said method comprising the steps of:

configuring a housing arrangement to support a locating arrangement and a marking arrangement; and interfacing a single operator actuation mechanism with a single electronics package for monitoring different predetermined operator actuations of the portable device such that the single electronics package monitors all the different predetermined operator actuations of the single operator actuation mechanism (i) to detect a first predetermined operator actuation for use in controlling the marking arrangement, (ii) to detect other predetermined operator actuations for use in controlling the locating arrangement in locating at least one of buried line and a boring tool, and (iii) to, upon detecting the first predetermined operator actuation, initiate marking by the marking arrangement.

28. The method of claim 27 wherein said step of arranging the electronics package arranges the electronics package to monitor a switch which forms a portion of the portable device for said first predetermined operator actuation and for said other predetermined operator actuations.

29. The method of claim 28 including the step of configuring the electronics package to electrically initiate marking by the marking arrangement responsive to a sequence of closing the switch twice in timed succession and then holding the switch closed.

30. A method for manufacturing a portable device, said method comprising the steps of:

provviding a housing arrangement;

supporting a locating arrangement in one operational orientation in said housing arrangement, said locating arrangement being configured for permitting an operator to locate at least one of a buried line and a boring tool;

supporting a ground marking arrangement in another operational orientation in said housing arrangement for use by the operator in identifying a location on the surface of the ground marking arrangement cooperate for use by the operator in identifying a location with the marking arrangemment; and interfacing a single operator actuation mechanism with a single electronics package in the portable locator for monitoring different predetermined operator actuations such that the single electronics package monitors all the different predetermined operator actuations of the single operator actuation mechanism (i) to detect a first predetemined operator actuation for use in controlling the ground marking arrangement, (ii) to detect other predetermined operator actuation for the use in controlling the locating arrangement and (iii) to, upon detecting the first predetermined operator actuation, initiate marking by the ground marking arrangement.

31. The method of claim 30 wherein said step of arranging the electronics package includes the step of configuring the electronics package to monitor a switch for said first predetermined operator actuation and said other predetermined operator actuations.

32. The method of claim 31 wherein said step of configuring the electronics package customizes the electronics package to monitor the switch for said first predetermined operator actuation as a sequence including closing the switch twice in timed succession and then holding the switch closed.

* * * * *